United States Patent [19]

Charych

[11] Patent Number: 4,564,767

[45] Date of Patent: Jan. 14, 1986

[54] UNINTERRUPTIBLE SWITCHING POWER SUPPLY SYSTEM

[75] Inventor: Arthur Charych, Stony Brook, N.Y.

[73] Assignee: TII Industries, Inc., Copiague, N.Y.

[21] Appl. No.: 548,944

[22] Filed: Nov. 7, 1983

[51] Int. Cl.$^4$ .............................................. H02J 9/06
[52] U.S. Cl. ........................................ 307/66; 307/48; 307/87
[58] Field of Search ...................... 307/46, 48, 64, 66, 307/87

[56] References Cited

U.S. PATENT DOCUMENTS

| 3,873,846 | 3/1975 | Morio et al. ........................ 307/66 X |
| 4,475,047 | 10/1984 | Ebert, Jr. .............................. 307/66 |
| 4,488,057 | 12/1984 | Clarke .............................. 307/46 X |

FOREIGN PATENT DOCUMENTS

2120474 11/1983 United Kingdom ................ 307/66

*Primary Examiner*—Reinhard J. Eisenzopf
*Assistant Examiner*—Derek S. Jennings
*Attorney, Agent, or Firm*—Sachs & Sachs

[57] ABSTRACT

A power supply system for providing uninterruptible DC output power with momentary failure of the primary or AC mains supply utilizing a DC power source for back-up includes a power transformer having two primary windings, rectifying means, a serially-connected high voltage switching device coupling one primary winding to the AC primary mains supply, and a low voltage switching device coupling the second primary winding to the back-up DC supply. An output winding on the power transformer is coupled to a rectifying device for providing a DC output voltage. A transition circuit arrangement senses the DC output voltage and the resulting DC voltage generated by rectifying the AC mains supply and controls the duty cycle of the high voltage and low voltage switching devices by gradually increasing the duty cycle of the low voltage switching device to supply additional power when the AC mains voltage and resulting DC voltage decreases, thereby providing a virtually transient-free DC output voltage. The present circuit arrangement is capable of supplying continuous output power with severe or minor brown-out conditions of the AC mains supply.

20 Claims, 13 Drawing Figures

UNINTERRUPTIBLE SWITCHING POWER SUPPLY SYSTEM

BACKGROUND OF THE INVENTION

1. Field of the Invention

The present invention relates to switching power supplies, and more specifically, to switching power supplies, which are primarily designed to be energized from the AC mains supply and are provided with a back-up DC voltage supply to provide transient-free DC output power during brown-out or failure of the AC mains supply.

2. Discussion of the Relevant Art

There are many circuit arrangements available for converting DC power into AC output voltage and conversely changing AC input voltage to DC output voltage that include various types of DC output regulation. With the advent of computers, and their sensitivity to input line voltage (AC mains) variations and transients appearing thereon, it has become necessary to provide a regulated DC power source for operation of these computers that is not subject to temporary AC mains failures or intermittent brown-out conditions. These conditions, including transients or voltage spikes such as those caused by turning on equipment which draw heavy amounts of power from the AC power lines, and those that are generated during operation or upon shutdown of equipment can create havoc if they were permitted to reach the output voltage powering today' computers. Consequently, some computer designs incorporate a sensing logic bus which is continually monitored by the computer logic circuitry. If the input line voltage were subjected to a sudden loss of voltage (transient), the logic circuitry senses this change and provides a signal voltage that freezes the computer memories or provides for their orderly shut-down, preventing a complete erasure of all the data stored therein and thus permit the computer to continue its operation as soon as the input voltage returns to its normal range of operation.

There are numerous techniques in use today which provide different protective measures for computer memories so that a complete reprogramming is not necessary the information previously stored in the memories remains intact.

SUMMARY OF THE INVENTION

The present invention overcomes the shortcomings of present circuit arrangements by providing a continuous transient-free DC output voltage completely isolated from any transients which occur on the input AC mains voltage. Particularly, the present circuit arrangement prevents failure of the Ac mains input voltage from appearing on the DC regulated output voltage. It provides for the utilization of an auxiliary DC power source to supply the necessary energy to maintain the DC output voltage transient-free with sudden partial dropouts or complete failure of the AC mains supply until the computer is able to shut down in an orderly manner and resumes automatically upon the introduction of the proper AC mains operating voltage.

Therefore, it is an object of the present invention to provide a system capable of providing uninterruptible DC output power from a main AC power source utilizing a DC power source as a back-up.

It is another object of the present invention to provide a reliable transient-free DC output voltage which will not respond to low voltage transients appearing on the AC mains input power source.

It is still another object of the present invention to provide transient-free DC output voltage from an AC mains power source or a DC power source switching therebetween in a continuous transient-free manner utilizing the DC power source only when the AC power source falls below a predetermined value.

It is still another object of the present invention to provide transient-free DC output voltage from an AC power source utilizing a DC power source as a back-up or auxiliary source of power while maintaining a relatively high efficiency.

It is yet another object of the present invention to provide a reliable DC transient-free output voltage from AC and DC power sources utilizing switching power supplies with a minimum number of conversions from input to output.

A power supply system for providing uninterruptible DC output power, according to the principles of the present invention, comprises in combination, a power transformer having first and second primary windings;, one end of the first primary winding is adapted to be coupled to a source of AC power and one end of the second primary winding is adapted to be coupled to a source of DC power which is isolated from the source of AC power. Also included are first and second switching devices; the second switching device is coupled between the DC power source and the second primary winding. An input rectifying device is connected in series with the first switching device between the AC power source and the first primary transformer winding; the rectifying device rectifies the AC power resulting in a DC voltage being coupled to the first switching device. At least one secondary winding is disposed upon the power transformer. At least one output rectifying device to provide a DC output voltage is connected to one of the secondary windings. A transition circuit arrangement is coupled to the DC output voltage and the resulting DC voltage for sensing their amplitude and is coupled to the first and second switching devices. The duty cycle of the second switching device is controlled by the transition circuit arrangement by increasing the duty cycle thereof to supply additional power when the resulting DC voltage decreases with a corresponding decrease in the AC line voltage, thereby providing a virtually transient-free DC output voltage.

The foregoing and other objects and advantages will appear from the description to follow. In the description, reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims. In the drawing, like reference characters refer to like elements.

BRIEF DESCRIPTION OF THE DRAWING

In order that the invention may be more fully understood, it will now be described, by way of example, with reference to the accompanying drawing in which.

The circuit arrangements shown in FIGS. 4 through 11 are all suitable for use in the uninterruptible power supply, according to the principles of the present invention.

DESCRIPTION OF THE PREFERRED EMBODIMENT

Figure 1A:
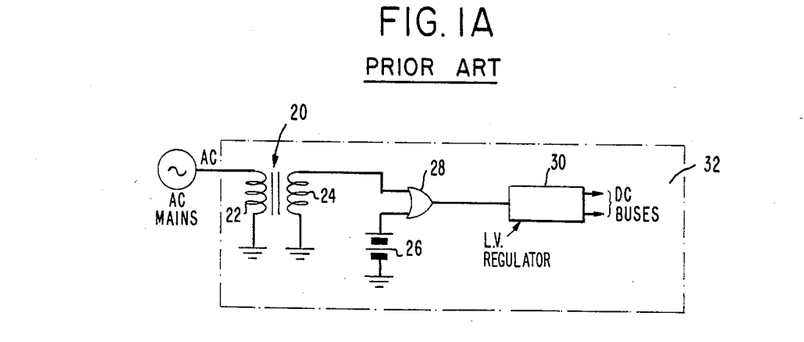
FIGS. 1A and 1B show a block diagram of an interruptible power supply known in the prior art.
Figure 1B:
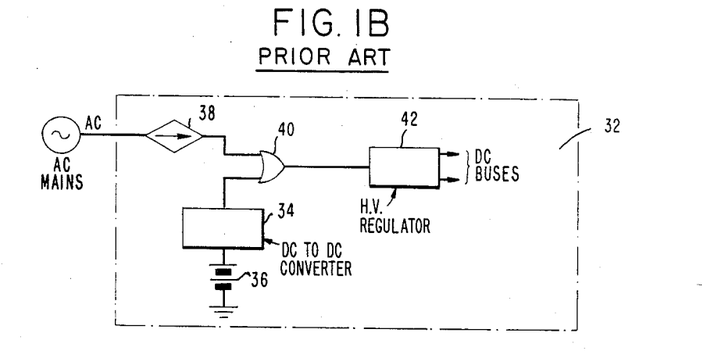

Referring now to the figures, and in particular, to FIGS. 1A and 1B, which show pictorial representations of power supplies known in the prior art suitable for operation from a source of AC power (AC mains). Each power supply has a source of DC voltage as an auxiliary or back-up power source to provide energy to a load, not shown, without having the load see any of the transients appearing on the AC input power. The auxiliary DC supply is capable of supplying energy to the load during low voltage excursions (transients) of the AC mains power. The diagram shown in FIG. 1A includes an input power transformer 20 having a primary winding 22 and a secondary winding 24 that provides isolation of the circuitry from the AC mains. Transformer 20 is commonly known as a step-down transformer, stepping down the AC mains voltage of approximately 120 volts rms to 24 or 48 volts to match the level of the battery. Utilizing this technique, the supply requires no additional power-wasting energy conversions to match the batteries 26 with the DC bus. The DC voltage may then be "ORed" with a power switch, in a conventional circuit arrangement shown at 28, which is then coupled to conventional regulator circuit arrangement 30 prior to being connected to the DC bus 32.

The circuit arrangement disclosed in FIG. 1B utilizes a separate DC to DC converter 34, of conventional design, energized from a battery 36 which provides the high voltage DC equivalent to that obtained by a rectifying circuit bridge 38 connected to the AC power input. Utilizing a power switching "OR" circuit 40, either the voltage appearing at the output of the bridge 38 or the rectified voltage appearing at the output of the DC to DC converter 34 is permitted to be coupled to the output regulator 42. The DC to DC converter 34 preferably uses a 24-volt lead acid battery and is chosen to be just above the minimum (brown-out) level at which the converter circuit operates. Should the AC mains voltage decrease, the rectified DC voltage appearing at the output of bridge 38 would also decrease, thus the OR circuitry 40 would permit the converted DC to be coupled to the output regulator 42. In this circuit arrangement, the battery is isolated from the AC mains power by the DC to DC converter.

Figure 1C:
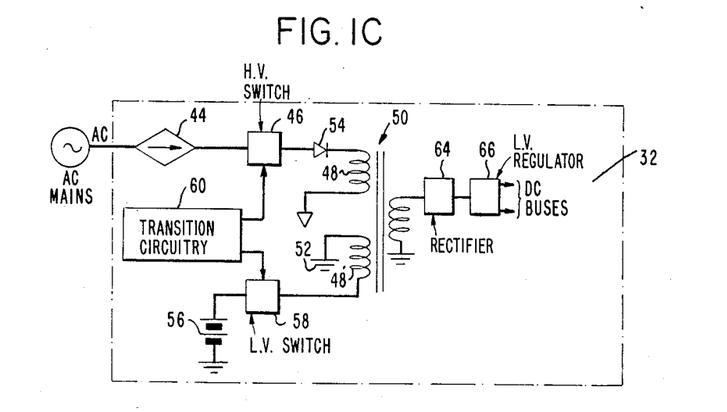
FIG. 1C shows a block diagram of an unterruptible power supply according to the principles of the present invention.

The block diagram shown in FIG. 1C is in accordance with the principles of the present invention, and includes a high voltage (HV) rectifying bridge 44 coupled to a high voltage switch 46 which in turn is coupled to one end of the primary winding 48 of transformer 50, via a diode 54. The other end of primary winding 48 is coupled to the negative side of diode bridge 44. It is obvious, to those knowledgeable in the art, that a tapped winding may be used as primary winding 48 with the tap being connected to ground 52. The additional portion of the winding or primary winding 48' is coupled to a battery 56, via a low voltage switch 58. The transition circuitry 60, which will be explained in detail hereinafter, is coupled between the high voltage switch 46 and the low voltage switch 58 and controls in a proportionate and gradual manner the duty cycle of each of the switches by increasing the duty cycle of low voltage switch 58 to provide additional power in a gradual transient-free (glitch-free) manner.

The transformer 50 is provided with a secondary winding 62 which is coupled to a rectifying circuit arrangement 64 and may additionally be connected to a regulator 66 before being connected to the DC bus 32. The transformer primary 48 is chosen to be coupled, via rectifying bridge 44, to the AC mains input power and is designed to handle the high-voltage/low-current appearing at the output of the rectifying bridge 44. The winding 48' is designed to be suitable for connection to the low-voltage/high-current provided by the battery source 56. Each source has its own chopping device or switch circuit associated therewith and either source may feed current pulses into the transformer and thus, power the load. The transition logic circuitry 60 is capable of shifting the load from one source to the other. In the event of an AC reduction or power failure, for example, the logic circuitry gradually (proportionately) increases the duty cycle (increase ratio of on to off time) of the pulses supplying the missing power from the battery source until the system is drawing all the required power from the battery. This transfer of power from the rectified AC high-voltage source to the battery low-voltage source and back again, without glitches, is one of the most desirable features of this circuit arrangement.

Figure 2:
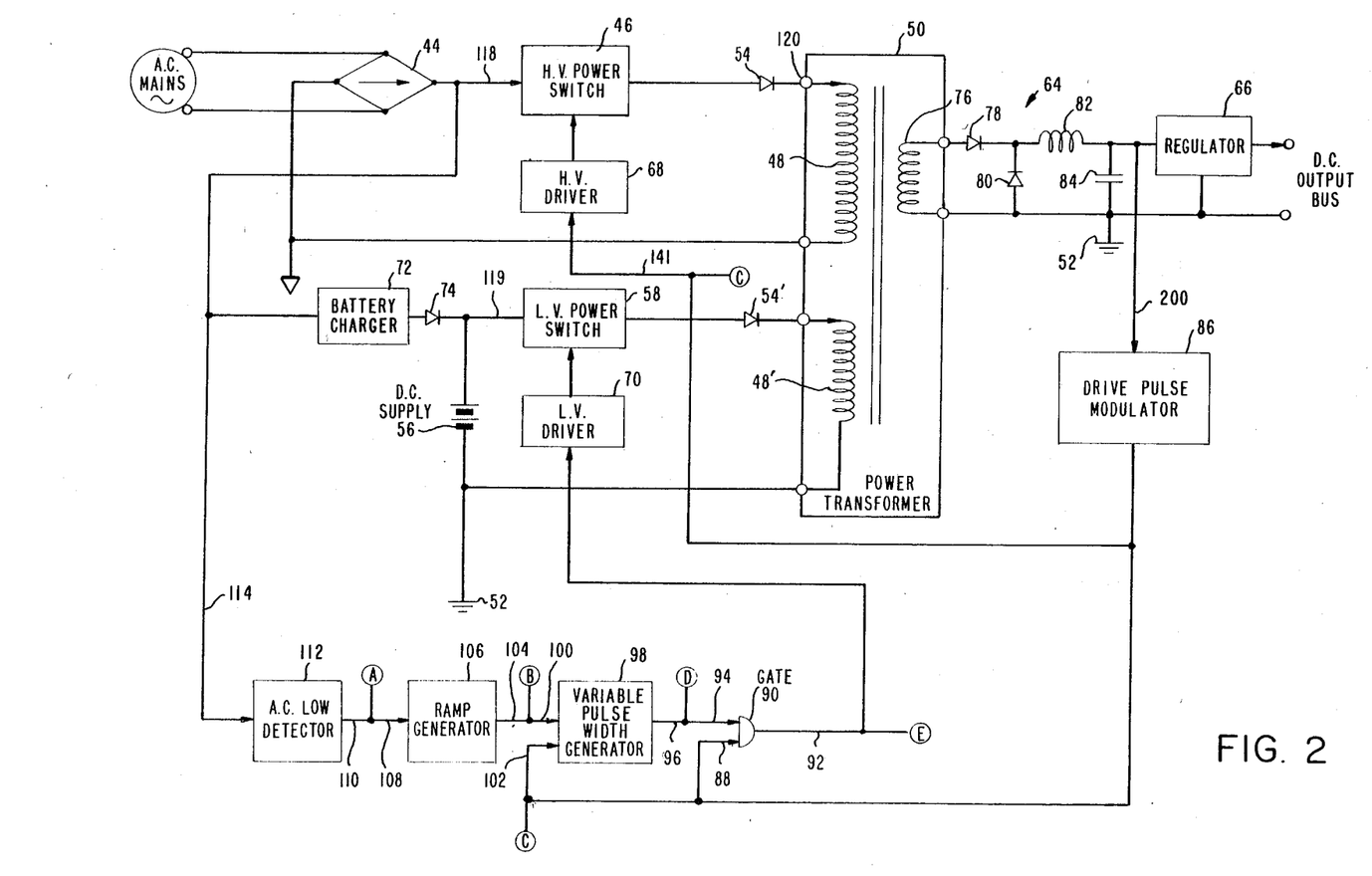
FIG. 2 is functional block diagram, in detail, of an uninterruptible power supply according to the principles of the invention.
Figure 3:
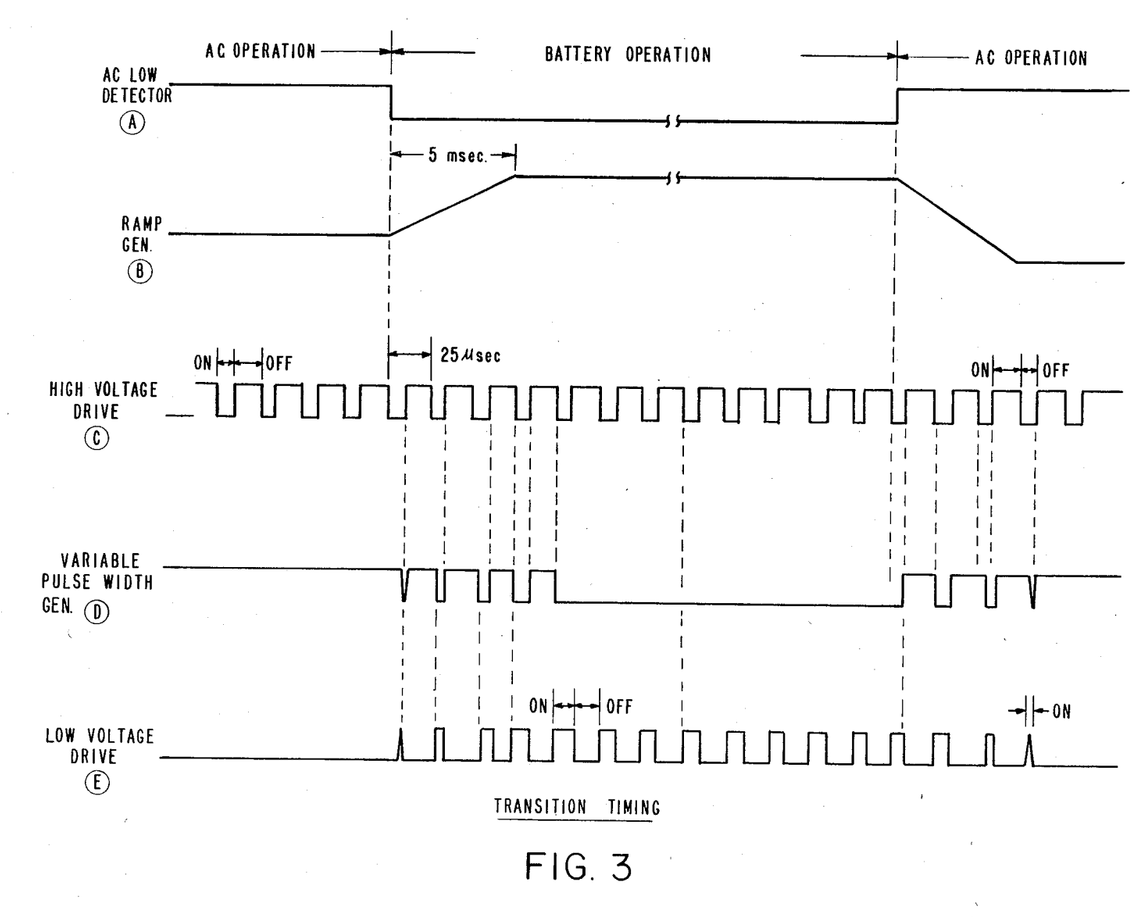
FIG. 3 is a pictorial representation of the voltage wave shapes appearing at various points of the block diagram shown in FIG. 2.

FIG. 2 is a detailed block diagram of the uninterruptible power supply according to the principles of the present invention and includes all the elements as set forth in FIG. 1C. The transition circuitry 60 is shown in more detail herein and will be further explained hereinafter. The high-voltage power switch 46 is connected in series with the rectifying bridge 44 which in turn is connected to the AC power source. The output of bridge 44 is rectified, resulting in a DC voltage which is either permitted to complete a current path through the power switch when it is turned on, or alternately, when it provides a high impedance in the current path, prevents current from flowing through diode 54 to the primary winding 48 of transformer 50. A high voltage driver circuit arrangement 68 is coupled to the high voltage power switch 46 and is capable of driving the power switch from it normally open condition (high impedance state) to its normally closed position (low impedance or conductive state). The driving voltage or HV driver 68 is shown in FIG. 3C during various times of operation. In the first portion of operation the supply is powered by the AC input power (AC operation) and the duty cycle is provided with a predetermined on to off ratio (approximately 35% on at nominal input and output) and a period of approximately 25 microseconds (40 KHz). During the second portion of operation, the output power (voltage) is provided by battery operation. The battery 56 supplies power incrementally (gradually) increasing its output during the period of 5 milliseconds until its on to off ratio (duty cycle) is approximately the same as that of the HV driver switch 68. As the AC mains line voltage increases for the third period of operation, which the same as the first period of operation, power from the AC mains input supplies the total output power and operation is tranferred in a gradual manner from the DC supply 56 to the AC mains in a five millisecond period as the AC mains voltage comes up to it operating range. Thereafter, the DC supply supplies no output power. This will be explained in greater detail hereinafter, together with the transition timing voltages as shown in FIG. 3.

The LV power switch 58 is coupled from the DC supply 56, via a diode 54' to the low-voltage primary winding 48'. A LV driver 70 is coupled to the LV power switch 58 and is capable of driving it from a normally opened condition (high impedance state) to a closed or conducting condition (low impedance) providing a current path from the DC supply 56 to the primary transformer winding 48'. A conventional battery charging circuit arrangement 72 is coupled from the rectifying bridge 44 to the DC supply 56 and will trickle charge the battery 56 as long as the DC output voltage from the rectifying bridge 44 remains greater than the voltage at the output terminal of battery 56 by the amount of the voltage drop of diode 74. The battery charging circuit arrangement 72 is not part of the instant invention and any suitable conventional type charging circuit may be utilized to maintain the battery 56 (DC supply) at its proper terminal voltage.

A secondary winding 76 is provided on transformer 50 and has coupled thereto a pair of diodes 78 and 80. The anode electrode of diode of 78 is connected to one end of winding 76 and the anode electrode of diode of 80 is connected to the other end of the same winding. The cathode electrodes of diodes 78 and 80 are connected in common and when the anode electrode 80 is connected to a ground reference point 52 will provide a pulse DC output voltage. This output voltage is filtered in a conventional manner by utilizing an inductor 82 together with a capacitor 84. If desired, an output regulator 66 may be utilized to provide additional regulation on the DC output bus or it may be used on other secondary DC outputs.

The DC output voltage is coupled to the drive pulse modulator circuit arrangment 86, which provides a rectangular output wave shape as shown in FIG. 3C with a period of approximately 25 microseconds (40 K Hz). The output voltage signal from the drive pulse modulator 86 is coupled to the HV driver 68 and one input terminal 88 of the gating circuit arrangement 90. The gating circuit arrangement 90 provides on its output terminal 92 the voltage shown in FIG. 3E. Output terminal 92 is coupled to the LV driver 70. Note that the voltage shown at 3E goes through various gradual changes in the duty cycle thereof relative to the functioning period of the power supply and the AC input line voltage. It is to be especially noted that the critical time occurs within a 5 milisecond period when the AC mains voltage drops below a predetermined value, and when the 5 milisecond period has past, the DC supply 56 is supplying the total energy needed for the DC output bus. During the 5 milisecond transition period, the DC supply gradually increases its duty cycle (on time to off time) until it supplies the total necessary power. When the AC line voltage increases past the predetermined set point value, it starts to contribute power to the output required and the DC supply has its duty cycle reduced so that its off time increases until it is completely turned off as shown in the voltage shape of FIG. 3E.

The other input terminal 94 of the gate 90 is provided with a voltage as shown in FIG. 3D, thus causing the gate circuit arrangement to function as an "AND" circuit and, once the AC mains input voltage disappears for a period of greater than 5 milliseconds, the LV driver 70 is driven only by the same voltage wave that drives the HV driver 68. By adjusting the turns ratio of the transformer primary windings 48 and 48', the volt amperes provided by each winding are made essentially the same. The voltage appearing on terminal 94 is obtained from output terminal 96 provided on the variable pulse width generator 98 which is also provided with a pair of input terminals 100 and 102. The voltage appearing on terminal 102 of the variable pulse width generator 98 is shown in FIG. 3C and the voltage on the other input terminal 100 is shown in FIG. 3B by providing the two input voltages as shown in FIGS. 3B and 3C on the input terminals, the output voltage appearing on terminal 96 is that which is shown in FIG. 3D.

Input terminal 100 of the variable pulse width generator 98 is coupled to output terminal 104 provided on the ramp generator circuit arrangement 106 which is also provided with an input terminal 108 that has thereon the voltage shown in FIG. 3A and generates the output voltage shown at FIG. 3B on its output terminal 104.

The input terminal 108 of ramp generator 106 is coupled to the output terminal 110 of the AC low voltage detector 112 which is provided with an input terminal 114 that is coupled to the output of the rectifying bridge 44. When the voltage appearing at the output of bridge 44 reduces below a predetermined value, the output of the AC low voltage detector 112 provides the output voltage shown at FIG. 3A on its output terminal 110.

The circuit arrangements utilized for the drive pulse modulator 86, ramp generator 106, the variable pulse width generator 98 and the gating circuit arrangement 90 are shown in detail in FIGS. 8, 9, 10 and 11, respectively, which will be discussed hereinafter.

Figure 4:
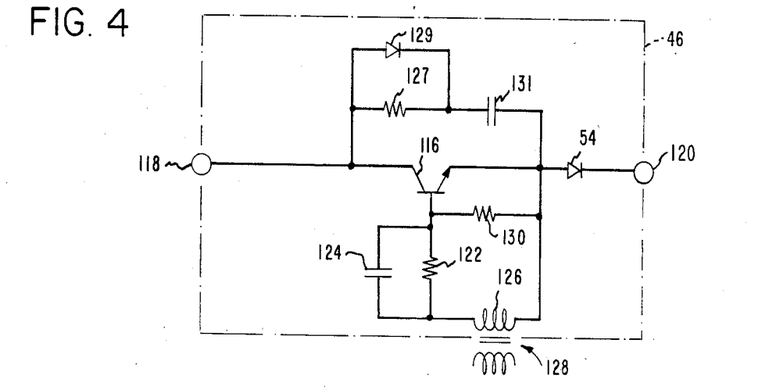
FIG. 4 is a schematic circuit diagram of a high voltage power switch.
Figure 5:
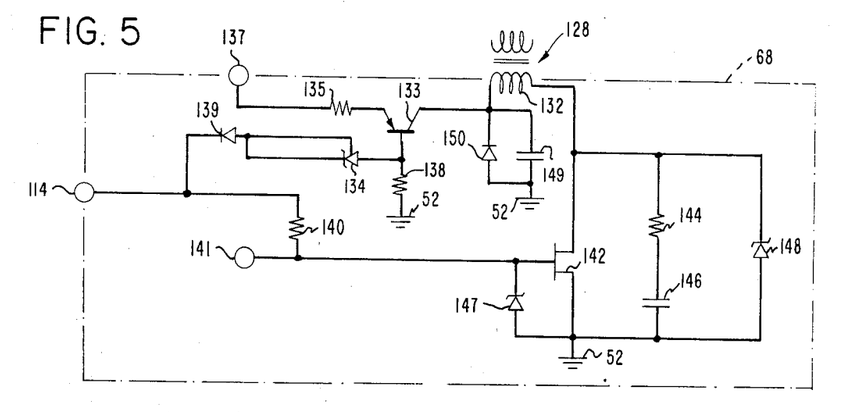
FIG. 5 is a schematic circuit diagram of a high voltage driver suitable for driving the high voltage switch shown in FIG. 4.

FIG. 4 is a schematic circuit diagram of a high voltage power switch suitable for operation in the block diagram shown in FIG. 2 and includes a high voltage, relatively high-current switching transistor 116. The collector electrode of transistor 116 is coupled to the output of rectifying bridge 44, via terminal 118. The emitter electrode of transistor 116 is coupled, via a diode 54 and terminal 120, to the high voltage primary winding 48 of transformer 50. The base electrode of transistor 116 is coupled, via a resistor 122 and a capacitor 124 connected in parallel, to one end of a secondary winding 126 of transformer 128. The other end of winding 126 is connected to the emitter electrode of transistor 116. A resistor 130 is connected between the base electrode and emitter electrode of transistor 116. The output of the HV driver 68 is a current that flows through the primary winding 132 of transformer 128 and method of obtaining is shown in FIG. 5. Resistor 127 and diode 129 are connected in parallel with the anode electrode of diode 129 being connected to the collector electrode of transistor 116. The cathode electrode of diode 129 is connected to capacitor 131, the other end of capacitor 131 is connected to the emitter electrode of transistor 116.

The HV driver circuit arrangement 68 includes a constant current source formed by transistor 133, adjustable zener diode 134 and resistor 135. The emitter electrode of transistor 133 is coupled, via resistor 135, to a source of DC voltage (developed from the AC source in a conventional manner), via terminal 137. The adjustable zener diode has its cathode electrode and its breakover adjusting electrode connected to terminal 114 and its anode electrode connected to the base electrode of transistor 133. The base electrode of transistor 133 is also coupled, via a resistor 138 to a ground reference point 52. Terminal 137 is connected, via diode 139, to terminal 114 which is coupled, via resistor 140, to terminal 141. Terminal 141 has thereon the output voltage (shown in FIG. 3C) appearing on the output terminal of the drive pulse modulator 86. The other end of winding 132 of transformer 128 is connected to the drain electrode of field effect transistor (FET) 142. The source electrode of transistor 142 is connected to the ground reference 52. A zener diode 144 has its cathode electrode connected to the gate electrode of FET 142 and its anode electrode connected to the ground reference 52. A resistor 144 and capacitor 146 are connected in series across the source and drain electrodes of transistor 142 and are in parallel with a zener diode 148 connected thereacross with its cathode electrode being connected to the drain electrode of FET 142 and the anode electrode being connected to the ground reference point 52.

The output of drive pulse modulator (FIG. 3C) 86 appearing on terminal 141 causes the FET 142 to switch from a high impedance state to a low impedance state, thus providing a path for the constant current source to provide current through winding 132 of transformer 128. Resistor 144, capacitor 146 and zener diode 148 protect FET 142 from overvoltages appearing across the source and drain electrodes thereof. Zener diode 147 protects FET 142 from having transients and reverse voltage appear between the gate and source of electrodes thereof. A diode 150 and capacitor 149 are connected in parallel from the collector electrode of transistor 133 to ground 52. Diode 150 and capacitor 149 provide a means for returning energy on the collapse of the square wave voltage back into the winding so that it switches efficiently from its conducting to its non-conducting conditions. The energy coupled across transformer 128 into winding 126 causes transistor 116 to turn from a high impedance state to a low impedance state, thus providing a means of turning on and off the current path between terminal 118 and terminal 120. Here again, resistor 127, diode 129 and capacitor 131 reduce transient voltages and provide for more efficient switching of transistor 116.

Figure 6:
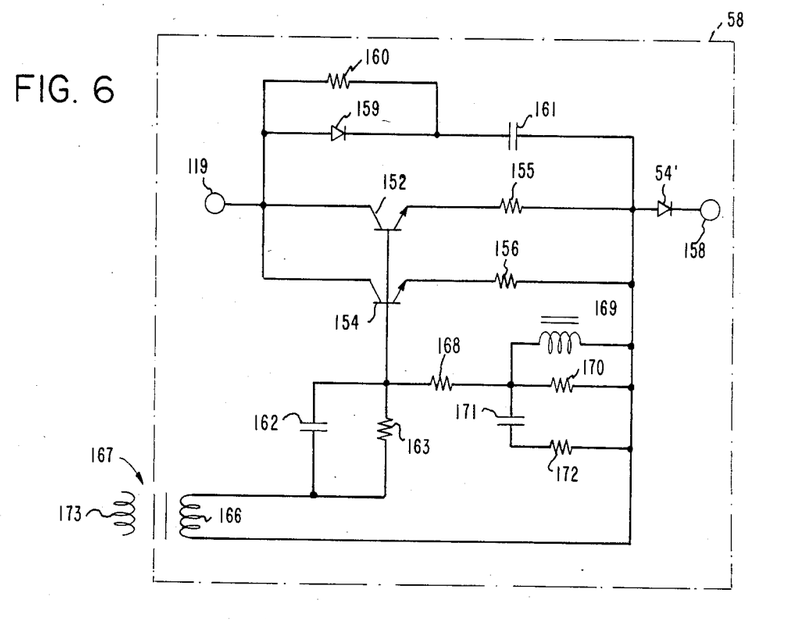
FIG. 6 is a schematic circuit diagram of a low voltage power switch.

Referring now to FIG. 6, which is schematic circuit diagram of the low voltage (LV) power switch 58 and includes a pair of low voltage/high current power switching transistors 152 and 154 having current equalizing resistors 155 and 156 connected in the emitter electrode circuits in a conventional parallel configuration with the far end of resistors 155 and 155 connected together and coupled, via diode 54', to terminal 158 of transformer 50. The collector electrodes of transistors 152 and 154 are connected together (parallel) to terminal 119, which is connected to the DC energy source 56, e.g. a battery. A diode 159 and resistor 160 are connected in parallel with the anode electrode of diode 159 being connected to the collector electrode of transistor 152 and the cathode electrode of diode 159 being coupled to the anode electrode of diode 54', via a capacitor 161. Here again, resistor 160, capacitor 161, together with diode 159 protect the transistors 152 and 154 from sudden overvoltage transients and insure noise-free switching. The base electrode of transistors 152 and 154 are coupled, via a parallel connection of capacitor 162 and resistor 163, to secondary winding 166 of transformer 167. The other end of transformer winding 166 is connected to the anode of diode 54'. A resistor 168 is connected from the base electrodes of transistors 152 and 154 to the anode electrode diode 54', via the parallel combination of an inductor 169 connected in parallel with a resistor 170, and serially connected to capacitor 171 and resistor 172, all of which function to provide the proper leading and trailing edges for the switching of transistors 152 and 154. The drive current pulses coupled from the primary winding 173 of transistor 167 into winding 166 causes the switching transistors 152 and 154 to switch from their normally open or non-conducting state to their on or conducting (low impedance state) providing large current pulses to the primary winding 48' in accordance with the pulses appearing at the input terminal 176 of the LV driver circuit arrangement 170. The voltage appearing on terminal 176 is shown in FIG. 3E.

Figure 7:
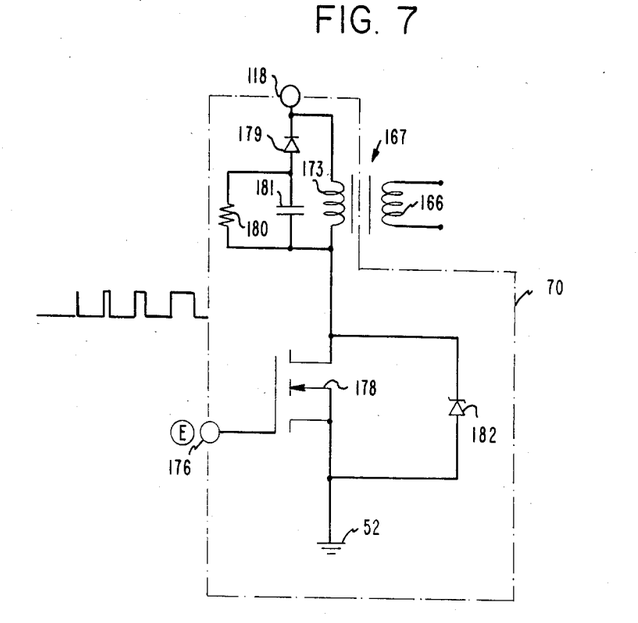
FIG. 7 is a schematic circuit diagram of a low voltage driver suitable for use with the low voltage power switch shown in FIG. 6.

FIG. 7 is a schematic circuit diagram of a low voltage (LV) driver circuit arrangement suitable for use with the instant invention, and includes a field effect transistor 178 having its source electrode connected to ground reference 52 and its drain electrode connected to one end of the primary winding 173 provided on transformer 167. The other end of primary winding 173 is connected to a source of DC voltage which appears on terminal 118. A diode 179 has its cathode electrode connected to terminal 118 together with one end of winding 173 and its anode electrode connected in series with the parallel connection of resistor 180 and capacitor 181 to the other end of winding 173. The combination of diode 179, resistor 180 and capacitor 181 insures clean, noise-free switching of the drive pulses. The gate electrode of transistor 178 is connected to terminal 176. The zener diode 182 has its cathode electrode connected to the drain electrode of transistor 178 and its anode electrode connected to the ground reference 52 and functions to limit the voltage appearing the source of drain electrodes of transistor 178.

Figure 8:
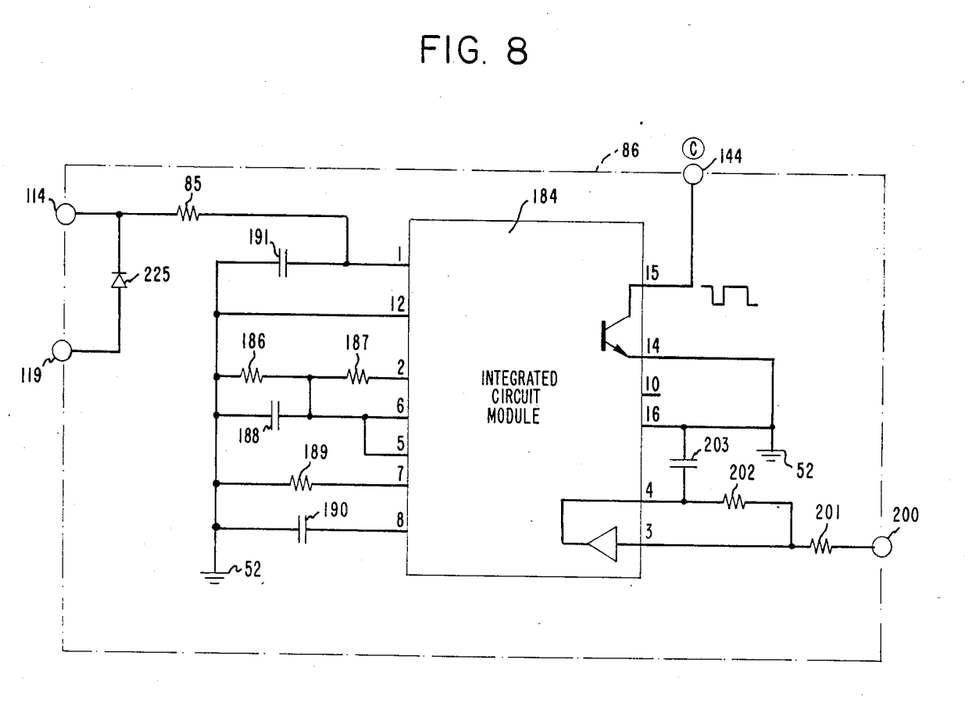
FIG. 8 is a schematic circuit diagram of a drive pulse modulator.

Referring now to FIG. 8, which discloses a suitable drive pulse modulator circuit arrangement 86 which includes an integrated circuit module 184 manufactured by the Signetics Corporation of California, known as Part No. NE5560 and includes all the necessary transistors and diodes internally to generate the output wave shape shown at FIG. 3C at its pin 15 which is connected to terminal 141. The integrated circuit module includes an internal circuit arrangement for reacting to a change in DC voltage appearing on terminal 200. Internal terminal number 1, used to power the module, is coupled via a resistor 185 to terminal 114. Terminal 1 of module 184 is also coupled, via a capacitor 191 to ground reference point 52. Terminal 12 of module 184 is connected to reference ground. Resistors 186 and 187 are connected in series from ground reference 52 to internal terminal 2 with their juncture being connected to terminals 5 and 6 of module 184. The juncture of resistors 186 and 187 is connected via a capacitor 188 to ground reference 52. Resistor 189 connected from ground reference 52 to terminal 7 of module 184 and capacitor 190 connected from ground reference 52 to terminal 8 of module 184 function to select the frequency of the output switching wave appearing on terminal 15 of module 184.

Module 184 is powered (internal terminal number 1), via terminal 114, through diode 139 from a source of DC voltage developed on terminal 137 from the AC source, in a conventional manner. In the event of failure of the AC source and a drop in DC voltage on terminal 137, terminal 114 becomes powered through diode 225 by terminal 119 which is connected to the source of DC supply (Battery 56).

The DC voltage appearing on terminal 200 is coupled, via a resistor 201 to terminal 3 of the module 184. Terminal 3 of module 184 is coupled to terminal 4 thereof, via a resistor 202. Terminal 4 is bypassed to ground reference 52, via a capacitor 203. Terminals 14 and 16 of module 184 are connected to reference ground 52. The drive pulse modulator circuit 86 functions as the frequency determining clock of the power supply and provides the fundamental duty cycle end period for normal operation. Integrated circuit module 184 senses the DC voltage appearing on terminal 200 and adjusts is duty cycle appearing on internal terminal 15 (terminal 141) to maintain the DC output voltage at a fixed value (regulated).

Figure 9:
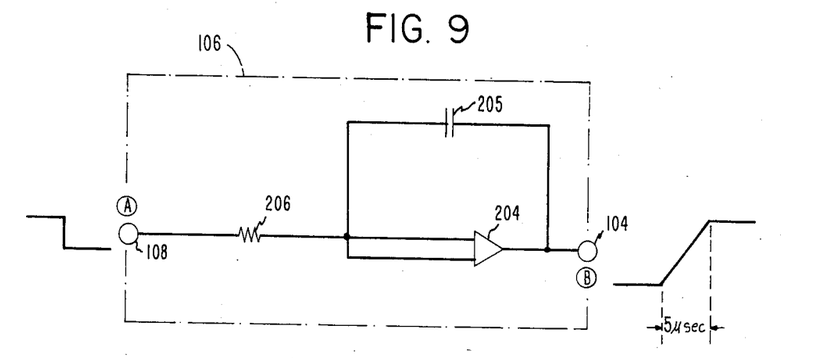
FIG. 9 is a schematic circuit diagram of a ramp generator.

Referring now to FIG. 9 which is a schematic circuit diagram of a ramp generator suitable for operation in the instant invention and it includes an operational amplifier 204 having its output voltage connected to terminal 104, which is shown in FIG. 3B as a ramp having a duration of approximately 5 miliseconds when a change in voltage appears at its input terminal 108 as shown in FIG. 3A. The two inputs to operational amplifier 204 are connected together and are coupled to output terminal 104, via a capacitor 205. The output terminal of the operational amplifier module 204 is coupled, via a resistor 206, to input terminal 108.

Figure 10:
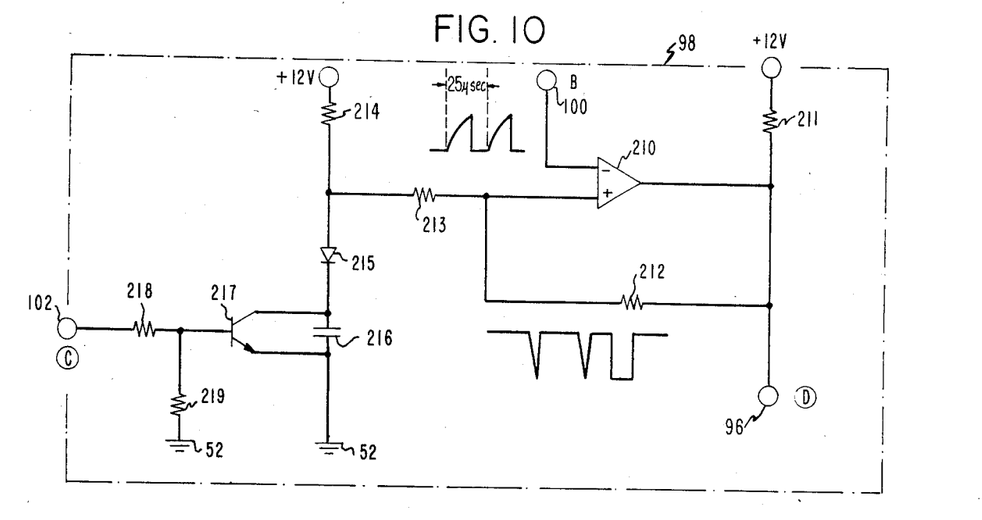
FIG. 10 is a schematic circuit diagram of a variable pulse width generator.

FIG. 10 discloses a schematic circuit arrangement of a variable pulse width generator circuit 98 suitable for use in the instant invention and includes an operational amplifier module 210 which has its output terminal connected to terminal 96 and provides the voltage shown in FIG. 3D. Output terminal of operational amplifier 210 is connected to a source of positive voltage (preferably 12 volts), via a resistor 211. One input terminal (negative) is connected to terminal 100 which has appearing thereon a voltage wave shown at FIG. 3B. The other input terminal (positive) is connected, via a resistor 212, to its output terminal 96 and is coupled, via a resistor 213, and a serially connected resistor 214 to the DC voltage source (12 volts). The juncture of resistors 213 and 214 are coupled, via a diode 215 and a serially connected capacitor 216, to the common reference ground 52. The cathode electrode of diode 215 is connected to capacitor 216, and the anode electrode of diode 215 is connected to the juncture of resistors 213 and 214. The collector and emitter electrodes of transistor 217 is connected to the cathode of diode 215 and the emitter electrode of transistor 217 is connected to reference ground 52. The base electrode of transistor 217 is coupled, via a resistor 218, to terminal 102 which has the voltage shown in FIG. 3C appearing thereon. The base electrode of transistor 217 is also coupled to ground 52, via a resistor 219.

Figure 11:
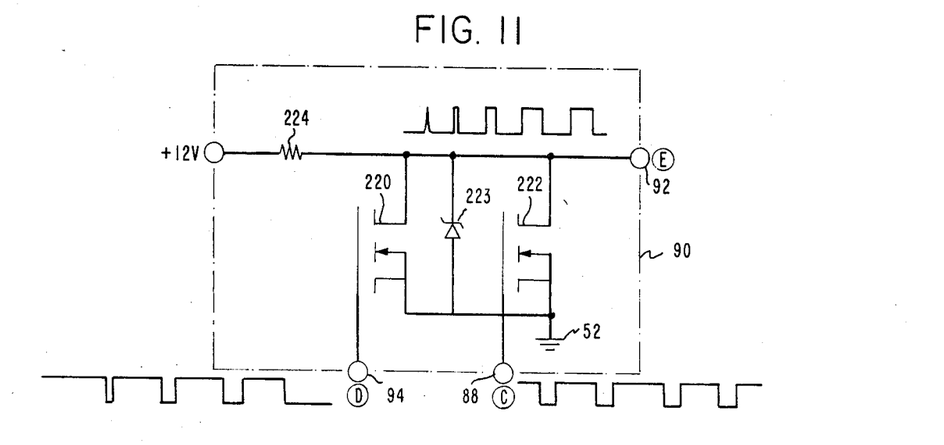
FIG. 11 is a schematic circuit diagram of a gate.

Referring now to FIG. 11 which discloses the gating circuit arrangement 90 suitable for use in the instant invention and it includes field effect transistors (FET's) 220 and 222 which have their source electrodes connected together to reference ground 52. The drain electrodes of FET's 220 and 222 are connected in common (parallel connection) and have the cathode electrode of zener diode 223 connected thereto with the anode electrode of the zener diode 223 being connected to the reference ground point 52 to limit the voltage appearing across the source of drain to a safe operating level. The drain electrodes of FET transistors 220 and 222 are coupled via a resistor 224 to a source of DC, preferably +12 volts. The output terminal 92 of the gating circuit is connected to the drain electrodes of the FET's 220 and 222. The gate electrode of FET 220 is connected to terminal 94 which has thereon the voltage shown at FIG. 3D. The gate electrode of FET 222 is connected to terminal 88 and has the voltage thereon shown in FIG. 3C.

The AC low voltage detector 112 and the battery charger circuit 72 are of conventional design, conventionally known in the art and therefore they have not been described herein in detail.

In operation, when the AC mains input power is coupled to the rectifying bridge, start up voltages cause the drive pulse modulator to begin switching at the selected frequency of operation which preferably is approximately 40 KHz, although operation in the range of 20 to 100 KHz is contemplated. The output voltage will be maintained at the predetermined value by the drive pulse modulator adjusting the duty cycle of the high voltage power switch. The low voltage power switch will not be activated (will not supply any power to the primary winding of power transformer 50). Should the AC mains input voltage reduce in value, such as that it is commonly known to occur when heavy equipment is turned on, the reduction in the resulting rectified DC will be sensed by the AC low voltage detector, which will provide an output voltage at its output terminal as shown in FIG. 3A, thus causing ramp generator 106 to provide an output voltage at its output as shown in FIG. 3B. This voltage connected to one input of the variable pulse width generator 98 with the output of drive pulse modulator 86 having its output voltage (shown at FIG. 3C) coupled to the other input of the variable pulse width generator 98 will yield an output as shown in FIG. 3D. Coupling the resulting output voltage to the input terminal of the gating circuit arrangement 90 together with the output of drive pulse modulator 86 will cause the gate circuit arrangement 90 to provide the voltage shown at FIG. 3E. The voltage appearing at FIG. 3E is coupled to the low voltage driver 70 and as explained earlier, the low voltage driver 70 will cause the low voltage power switch 58 to provide the necessary power to maintain the loop in a stable condition as shown by the changes in the wave shapes and their location in the circuit arrangement. The transition of current pulses from the DC power source to the AC power source and return is accomplished in a smooth, gradual manner, thereby insuring that the output voltage remains transient-free (glitch-free). Thus, a simplified circuit arrangement is disclosed which utilizes only one DC converter from the AC source to provide a DC output voltage and a similar conversion from the DC source to provide the same output voltage, thereby increasing the overall efficiency of a power supply capable of providing transient-free output power with intermittent losses of the AC mains power. With increased efficiency as disclosed herein, the DC supply (battery) is capable of maintaining a computer system in operation for longer periods of time with main power failures. The configuration set forth herein also provides a complete isolation of the battery (DC source) from the AC line.

Hereinbefore has been disclosed a reliable, transient-free method of providing output power from combined AC input power source and back-up DC power source. It will be understood that various changes in the details, materials, arrangement of parts and operating conditions which have been herein described and illustrated in order to explain the nature of the invention may be made by those skilled in the art within the principles and scope of the present invention.

TABLE OF COMPONENTS

| Part No. | Component | Value | Manufacturer |
|---|---|---|---|
| 54 | diode | IN918 | Motorola |
| 74 | diode | IN4001 | Motorola |
| 78 | diode | 40CDQ030 | International Rectifier |
| 80 | diode | 40CDQ030 | International Rectifier |
| 84 | capacitor | 4100 UF, 6.3 v | Mallory |
| 122 | resistor | 15 ohm, ¼ w | RCD |
| 124 | capacitor | 10 UF, 25 vNP | RCD |
| 127 | resistor | 750 ohm, 10 w | RCD |
| 129 | diode | IN818 | Motorola |
| 130 | resistor | 100 ohm, ¼ w | Mallory |
| 131 | capacitor | PCV1621 | Mallory |
| 134 | zener diode | TL430 | Texas Instruments |
| 135 | resistor | 10 ohm, ¼ w | |
| 138 | resistor | 4.7K ohm, ¼ w | |
| 139 | diode | IN4002 | Motorola |
| 140 | resistor | 2.2K ohm, ¼ w | |
| 142 | field effect transistor | VN10KM | Intersil |
| 144 | resistor | 4.7 ohm, ¼ w | |
| 146 | capacitor | .001 UF | |
| 147 | zener diode | 8.2 v, IN4738 | |
| 148 | diode | IN4002 | Motorola |
| 149 | capacitor | 10 UF, 35 v | |
| 150 | diode | IN4002 | Motorola |
| 155 | resistor | .02 ohm, 5 w | RCD |
| 156 | resistor | .02 ohm, 5 w | RCD |
| 159 | diode | MR821 | Motorola |
| 160 | resistor | 27 ohm, 20 w | RCD |
| 161 | capacitor | .1 UF, 200 v | Sprague |
| 162 | capacitor | 1 UF, 50 v | Sprague |
| 163 | resistor | .47 ohm, 10 w | RCD |
| 168 | resistor | 1.5 ohm, 3 w | RCD |
| 170 | resistor | 22 ohm, ¼ w | |
| 171 | capacitor | .1 UF, 50 v | Sprague |
| 172 | resistor | 10 ohm, ¼ w | |
| 179 | diode | IN4936 | Motorola |
| 180 | resistor | 2.2K ohm, ½ w | |
| 181 | capacitor | .1 UF, 50 v | Sprague |
| 184 | module | | NE5560 Signetics |
| 185 | resistor | 680 ohm, 1 w | RCD |
| 186 | resistor | 12k ohm, ¼ w | |
| 187 | resistor | 12K ohm, ¼ w | |
| 188 | capacitor | 33 UF, 35 v | Sprague |

TABLE OF COMPONENTS-continued

| Part No. | Component | Value | Manufacturer |
|---|---|---|---|
| 189 | resistor | 12K ohm, ¼ w | |
| 190 | capacitor | .0033 UF, 63 v | Sprague |
| 191 | capacitor | 10 UF, 35 v | Sprague |
| 201 | resistor | 2.2K ohm, ¼ w | |
| 202 | resistor | 100K ohm, ¼ w | |
| 203 | capacitor | .022 UF, 100 v | Sprague |
| 205 | capacitor | .01 UF, 50 v | Sprague |
| 206 | resistor | 220K ohm, ¼ w | |
| 211 | resistor | 10K ohm, ¼ w | |
| 212 | resistor | 100K ohm, ¼ w | |
| 213 | resistor | 1K ohm, ¼ w | |
| 214 | resistor | 10K ohm, ¼ w | |
| 215 | diode | IN4002 | Motorola |
| 216 | capacitor | .001 UF, 1K v | Sprague |
| 218 | resistor | 2K ohm, ¼ w | |
| 219 | resistor | 1K ohm, ¼ w | |
| 220 | field effect transistor | VNK10M | Intersil |
| 222 | field effect transistor | VNK10M | Intersil |
| 223 | zener diode | 8.2 v, IN4738 | Motorola |
| 224 | resistor | 1K ohm, ½ w | |
| 225 | diode | IN4002 | Motorola |

Having thus set forth the nature of the invention, what is claimed is:

1. A power supply system for providing uninterruptible DC output power comprising, in combination:
    (a) a power transformer having first and second primary windings, one end of said first primary winding being coupled to a source of AC power, one end of said second primary winding being coupled to a source of DC power isolated from said source of AC power, the other ends of said first and second primary windings being coupled to different reference grounds;
    (b) first and second switching means, said second switching means being coupled between said DC power source and said second primary winding;
    (c) input rectifying means connected in series with said first switching means between said AC power source and said first primary transformer winding, said rectifying means rectifying said AC power resulting in a DC voltage being coupled to said first switching means;
    (d) at least one secondary output winding disposed upon said power transformer;
    (e) at least one output rectifying means for providing a DC output voltage, said output rectifying means being connected to one of said secondary windings;
    (f) transition means coupled to said DC output voltage, said resulting DC voltage and said first and second switching means, for sensing the amplitude of said DC output voltage and said resulting DC voltage and controlling the duty cycle of said second switching means by increasing the duty cycle of said second switching means to supply additional power when said resulting DC voltage decreases, thereby providing a virtually transient-free DC output voltage.

2. A power supply system according to claim 1 wherein said DC power source is connected to a DC reference ground.

3. A power supply system according to claim 1 wherein said first and second switching means includes a power transistor disposed in a DC current path to said first and second primary power windings, respectively.

4. A power supply system according to claim 3 wherein said first and second switching means further includes first and second driver means having input and output terminals, said driver means output terminals being coupled to the base electrodes of said first and second transistors, respectively, each said driver means being capable of driving said respective power transistors between a normally open non-conducting state between their respective emitter and collector electrodes to a closed conducting state therebetween.

5. A power supply system according to claim 4 wherein each said first and second driver means operates at a switching frequency of between 20 kilohertz and 100 kilohertz.

6. A power supply system according to claim 3 further including diode blocking means disposed in series with said power transistors for preventing switching voltages transients from destroying said power transistors.

7. A power supply system according to claim 1 wherein said first rectification means includes a semiconductor diode bridge.

8. A power supply system according to claim 1 wherein said DC power source is battery.

9. A power supply system according to claim 8 further including means for trickle charging said battery.

10. A system for providing uninterruptible transient-free DC output power from a first AC or mains power source and a second or back-up DC power source comprising, in combination:
(a) a power transformer having a tapped primary winding and at least one secondary winding, the tap of said primary tapped winding being coupled to a reference point;
(b) first and second switching means, said second switching means being coupled between said DC power source and one end of said primary winding;
(c) first rectification means coupled in series with said first switching means between said AC power source and the other end of said primary winding, said first rectification means rectifying said AC power resulting in a DC voltage, said resulting DC voltage being coupled to said first switching means;
(d) output rectification means coupled to one of said secondary windings for providing a DC output voltage;
(e) transition means coupled to said DC output voltage, said resulting DC voltage and said first and second switching means, for sensing the amplitude of said DC output voltage and said resulting DC voltage and controlling the duty cycle of second switching means to increase the duty cycle of said second switching means to supply additional power when said resulting DC voltage amplitude is reduced below a predetermined value, thereby providing a virtually transient-free DC output voltage.

11. A system according to claim 10 wherein said tapped primary winding includes two separate primary windings having one end of each winding coupled together.

12. A system according to claim 11 wherein said one end of each primary winding is coupled to the same reference ground.

13. A system according to claim 11 wherein said winding coupling includes a semi-conductor diode.

14. A system according to claim 10 wherein said DC power source is connected to said reference point.

15. A system according to claim 10 wherein said switching means includes a power transistor having its collector and emitter electrodes disposed in the DC current path to each said primary winding.

16. A system according to claim 10 wherein said DC power source is battery.

17. A system according to claim 16 further including means for trickle charging said battery.

18. A power supply system for providing uninterruptible DC output power comprising, in combination:
(a) a power transformer having first and second primary windings, one end of said first primary winding being coupled to a source of AC power, one end of said second primary winding being coupled to a source of DC power isolated from said source of AC power, the other ends of said first and second primary windings being coupled to different reference grounds;
(b) first and second switching means, said second switching means being coupled between said DC power source and said second primary winding;
(c) input rectifying means connected in series with said first switching means between said AC power and said first primary transformer winding, said rectifying means rectifying said AC power resulting in a DC voltage being coupled to said first switching means;
(d) at least one secondary output winding disposed upon said power transformer;
(e) at least one output rectifying means for providing a DC output voltage, said output rectifying means being connected to one of said secondary windings, wherein said output rectifying means includes a pair of semi-conductor diodes having anode and cathode electrodes, said diode cathode electrodes being connected together and coupled to an output terminal, one of said diode anode electrodes being connected to each end of said output winding, one end of said output winding being connected to said reference ground; and
(f) transition means coupled to said DC output voltage, said resulting DC voltage and said first and second switching means, for sensing the amplitude of said DC output voltage and said resulting DC voltage and controlling the duty cycle of said second switching means by increasing the duty cycle of said second switching means to supply additional power when said resulting DC voltage decreases, thereby providing a virtually transient-free DC output voltage.

19. A power supply system for providing uninterruptible DC output power comprising, in combination:
(a) a power transformer having first and second primary windings, one end of said first primary winding being coupled to a source of AC power, one end of said second primary winding being coupled to a source of DC power isolated from said source of AC power, the other ends of said first and second primary windings being coupled to different reference grounds;
(b) first and second switching means, said second switching means being coupled between said DC power source and said second primary winding, wherein said first and second switching means including:

(i) a first and second power transistor disposed in a DC current path to said first and second primary power windings, respectively, (ii) first and second driver means having input and output terminals, said driver means output terminals being coupled to the base electrodes of said first and second power transistors, respectively, each said driver means being capable of driving said respective power transistors between a normally open non-conducting state between their respective emitter and collector electrodes to a closed conducting state therebetween;

(c) input rectifying means connected in series with said first switching means between said AC power source and said first primary transformer winding, said rectifying means rectifying said AC power resulting in a DC voltage being coupled to said first switching means;

(d) at least one secondary output winding disposed upon said power transformer;

(e) at least one output rectifying means for providing a DC output voltage, said output rectifying means being connected to one of said secondary windings; and (f) transition means coupled to said DC output voltage, said resulting DC voltage and said first and second swtiching means, for sensing the amplitude of said DC output voltage and said resulting DC voltage and controlling the duty cycle of said second switching means by increasing the duty cycle of said second switching means to supply additional power when said resulting DC voltage decreases, thereby providing a virtually transient-free DC output voltage, wherein said transition means including:

(i) drive pulse modulator means having an input and an output terminal, for providing a rectangularly-shaped switching voltage at said output terminal with a frequency directly proportional to the amplitude of said DC output voltage within a preselected range, said modulator means input terminal being coupled to said DC output voltage, said modulator means output terminal being coupled to said first driver means input terminal, (ii) variable pulse width generator means, having a pair of input terminals and an output terminal, for providing on said generator means output terminal a variable pulse width switching voltage, one of said generator means input terminals having an internally generated saw-tooth voltage coupled thereon, the other of said generator means input terminals being coupled to said driving pulse modulator means output terminals, (iii) gating means having an output terminal and a pair of input terminals for providing a proportional variable duty cycle switching output voltage on said gating means output terminal, said gating means output terminal being coupled to said second driver means, said first gating means input terminal being coupled to said variable pulse width generator means output terminal, and (iv) ramp generator means, having an input and an output terminal, for generating a ramp output voltage on said ramp generator means output terminal, said ramp generator means output terminal being coupled to said variable pulse generator means other input terminal, said ramp generator providing said ramp output voltage on said ramp generator means output terminal when receiving a voltage change appearing on its input terminal.

20. A power supply system according to claim 19 further including detector means having an input terminal and an output terminal for providing an output voltage change when said AC voltage and said resulting DC voltage coupled to said detector means input terminal falls below a predetermined value, said detector means output terminal being coupled to said ramp generator means input terminal.

* * * * *